Figure 1:
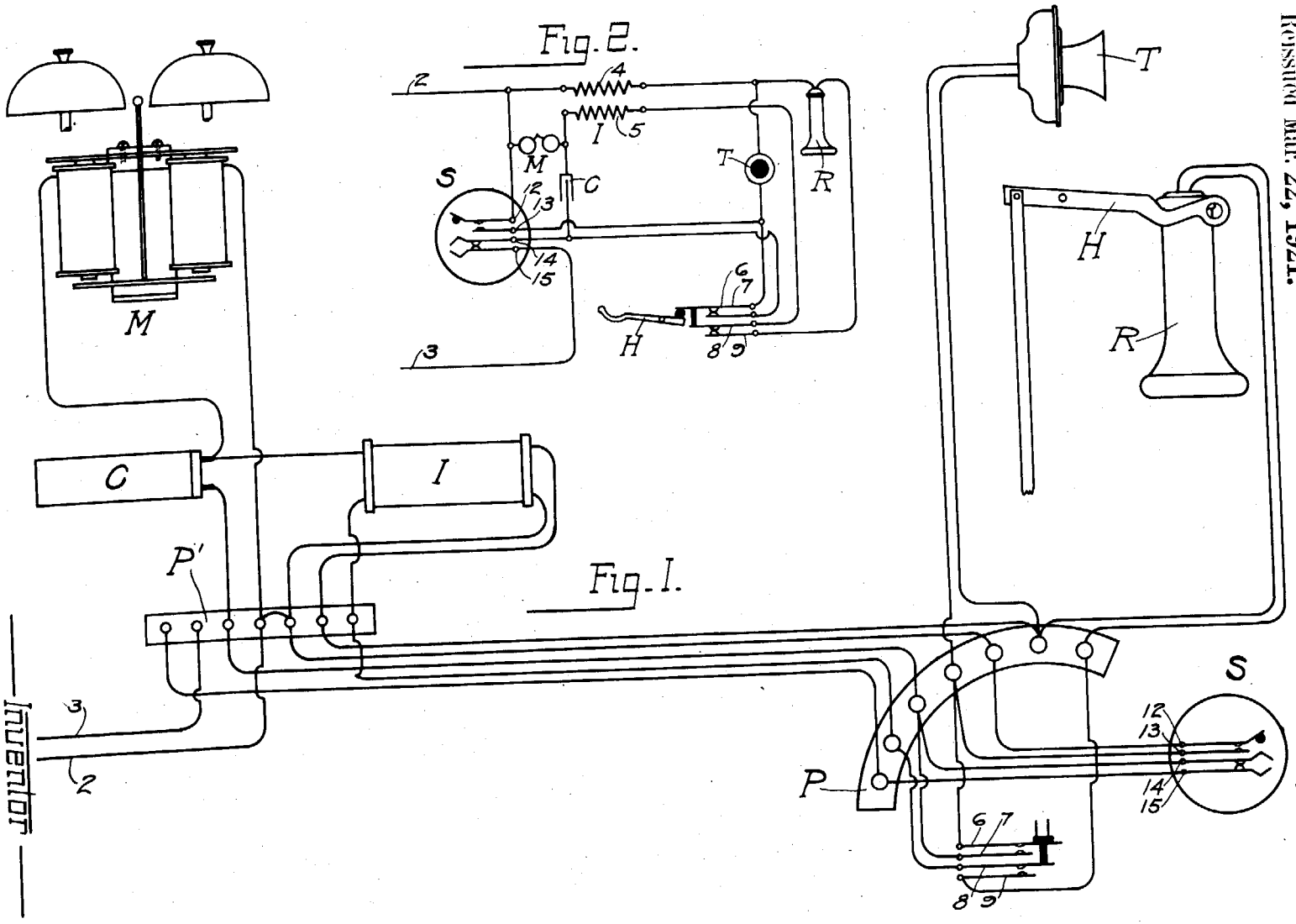

B. D. WILLIS.

SUBSTATION TELEPHONE CIRCUITS.

APPLICATION FILED OCT. 16, 1919.

Reissued Mar. 22, 1921.

15,070.

Inventor

Bernard D. Willis

Chas. W. Candy Atty.

UNITED STATES PATENT OFFICE.

BERNARD D. WILLIS, OF CHICAGO, ILLINOIS, ASSIGNOR TO AUTOMATIC ELECTRIC COMPANY, OF CHICAGO, ILLINOIS, A CORPORATION OF ILLINOIS.

SUBSTATION TELEPHONE-CIRCUITS.

15,070. Specification of Reissued Letters Patent. Reissued Mar. 22, 1921.

Original No. 1,313,570, dated August 19, 1919, Serial No. 116,487, filed August 23, 1916. Application for reissue filed October 16, 1919. Serial No. 331,210.

*To all whom it may concern:*

Be it known that I, BERNARD D. WILLIS, a citizen of the United States of America, and a resident of Chicago, county of Cook, and State of Illinois, have invented certain new and useful Improvements in Substation Telephone-Circuits, of which the following is a specification.

My invention relates in general to substation telephone circuits but is more particularly concerned with substation circuits for automatic telephone systems.

Briefly stated, the object of my invention is to provide a circuit arrangement whereby there is introduced in a well known common battery substation circuit a subscriber's impulse sender, also old in the art with a view to producing a more simple and efficient substation arrangement for automatic telephone systems than has hitherto been available.

The preferred form of the invention has been illustrated in the drawing by means of two figures, of which Figure 1 is a detailed wiring diagram of an embodiment of the invention which comprises a desk telephone set, while Fig. 2 is a diagrammatic showing of the fundamental principles involved.

Referring now to Fig. 2, the talking circuit is similar to the arrangement shown in the patent to Scribner, #669,710, the transmitter T and a winding 4 of the induction coil I being in a bridge of the line conductors 2 and 3, while the receiver R in series with the condenser C and the other winding 5 of the induction coil I is connected in shunt of the transmitter. The above circuits of the transmitter and receiver are normally open and are closed when the receiver is removed from the receiver hook H. An inspection of the figures will show that the transmitter bridge includes the switch hook controlled contact springs 6 and 7, while the receiver circuit includes these same contact springs and also the switch hook controlled contact springs 8 and 9.

A signaling bridge, comprising the ringer M and the previously mentioned condenser C, is provided as usual. It will be observed that this bridge is not under the control of the switch hook.

The subscriber's impulse sender or calling device, indicated by reference character S, may be of the type shown in the patent to Blessing #1,119,394. It comprises essentially a pair of impulse springs 14 and 15, controlled by a cam (not shown) through the medium of a finger hole dial (also not shown), and a pair of shunt springs 12 and 13 which are closed whenever the dial is turned from its normal position. The impulse springs 14 and 15 are included in series with the line conductor 3 and their function is to produce momentary interruptions of the line circuit for the purpose of operating the central office switching devices. The shunt springs S, when closed, short-circuit the signaling and talking circuit bridges in order to reduce the impedance and resistance of the line circuit, to prevent the interruptions being heard in the receiver, and to prevent tapping of the bell during the transmission of impulses. It is to be noted that the connections of these shunt springs are such that if the calling device dial is operated when the receiver is on the hook the line will not be short-circuited.

In Fig. 1 a specific form of the circuit shown in Fig. 2 has been drawn in detail. The apparatus at the right of the drawing and comprising the transmitter T, the receiver R, the switch hook H, and the calling device S constitutes a desk set telephone; while the apparatus at the left of the drawing and comprising the ringer M, the condenser C and the induction coil I is separate from the said telephone and may be mounted in the usual bell box. The telephone is provided with a terminal strip P in the base thereof and the bell box is provided with a terminal strip P′. The various circuits are completed by means of a five conductor cord which connects the two terminal strips.

The advantageous arrangement of the various parts just described would not be possible without adding additional cord conductors and other complications were it not for the new combination of circuits.

The operation of a substation instrument embodying my new circuits is as follows: When the receiver is removed to initiate a call the switch hook controlled contact springs 6 and 8 come into engagement, respectively, with the contact springs 7 and 9, whereby the transmitter bridge and the receiver circuit are closed. Responsive to the closure of the transmitter bridge current is supplied to the transmitter from a bridged battery at the central office (not shown) over the following path: line conductor 2, winding 4 of the induction coil I, transmitter T, switch hook springs 6 and 7, and calling device impulse springs 14 and 15 to line conductor 3. The bridge at the central office which includes the battery may also, in accordance with the usual practice, include the controlling relay of an automatic switch, the circuit of such relay including, therefore, the transmitter bridge at the substation. It follows that the calling subscriber may by suitably manipulating his calling device dial produce a series of interruptions in the circuit of the controlling relay to bring about the operation of the said switch. It is important to note in this connection that as soon as the dial is turned from its normal position the substation loop is completed over a new path as follows: line conductor 2, shunt springs 12 and 13, switch hook springs 6 and 7, and impulse springs 14 and 15 to line conductor 3. By the closure of the above circuit the signaling and talking circuit bridges are short-circuited for the purposes previously mentioned. Successive operations of the dial will now result in the operation of successive switches at the exchange, until the connection is finally completed to the line of the called subscriber, it being understood that all the switches are provided with controlling relay bridges which with the exception of the bridge in the last switch, are successively cut off from the line when their associated switches are operated.

The connection being completed, conversation may be held as desired. Since the operation of the talking circuits is well known it is not thought to be necessary to devote any space to the description of such operation herein. It may be mentioned, however, that the ringer M which is bridged across the line during conversation, should be of very high impedance. When the receiver is replaced at the termination of the conversation the switch hook controlled contact springs are separated to remove the transmitter from the line and to open the receiver circuit. It is necessary to open the circuit of the receiver in addition to that of the transmitter for otherwise the receiver together with the two windings of the induction coil would form a shunt around the ringer M. The direct current loop at the substation being broken by the replacement of the receiver, current ceases to flow over the line conductors and the switches at the central office are accordingly restored to normal in the usual and well known manner. The substation is now in condition to receive signaling currents which may come in over the line conductors and traverse the ringer M and the condenser C, whereby the ringer is actuated to advise the subscriber of an incoming call.

It will be seen from the foregoing that I have devised new and simple circuits whereby a common battery substation talking apparatus and a subscriber's impulse sender are combined without detracting from the talking qualities of the apparatus and without interfering with the efficient operation of the impulse sender, thereby producing a highly desirable substation equipment for automatic telephone systems.

Having described my invention, what I consider to be new and desire to have protected by Letters Patent will be pointed out in the appended claims.

What I claim as my invention is:

1. In a substation telephone set, an induction coil, a line circuit, a transmitter and one winding of said induction coil in a bridge of said line, said bridge including contact springs for closing the same; a local circuit connecting opposite terminals of said transmitter and including said contact springs, a condenser, a second winding of said induction coil, and a receiver; and a second set of contact springs in the said local circuit between the receiver and the said second coil winding.

2. In a substation telephone set, a line circuit, an induction coil, a transmitter and one winding of said induction coil in bridge of said line, said bridge including contact springs for closing the same, a local circuit connecting opposite terminals of said transmitter and including said contact springs but excluding said induction coil winding, a receiver and the second winding of said induction coil in said local circuit, a condenser in series with said receiver, a second set of contact springs in the local circuit outside of said bridge, and means controlled by the switch hook for closing said sets of contact springs.

3. In a substation telephone set, a line circuit; an induction coil; a transmitter and one winding of said induction coil in a bridge of the line; a normally open connection in said bridge; a local circuit connecting opposite terminals of said transmitter and excluding said induction coil winding; a condenser, a second winding of said induction coil, a receiver, and a second normally open connection all included in said last circuit; and means for closing said bridge and local circuit.

4. In a substation telephone set, an induction coil, a transmitter and a circuit therefor including a winding of said induction coil, a receiver and a circuit therefor including a condenser, a second winding of said induction coil, and the said transmitter, two normally open connections in said receiver circuit, the receiver and transmitter being included between said open connections and one side of the circuit and the condenser and second coil winding being included between said open connections and the other side of said circuit, and means for closing said connections.

5. In a substation telephone set, an induction coil, a transmitter and a circuit therefor including one winding of said induction coil, a receiver and a circuit therefor including a condenser, a second winding of said induction coil, and the said transmitter, a normally open connection in the conductor common to said circuits, a second normally open connection between the receiver and the said second winding, and means for closing said connections.

6. In a substation telephone set, a transmitter and a circuit therefor, a receiver and a circuit therefor including a condenser, and the said transmitter, an induction coil having two windings included, respectively, in the said transmitter and receiver circuits, a conductor common to said circuits having a normally open connection, a second normally open connection in the receiver circuit outside the common conductor, and means for closing said connections.

7. In a telephone substation, a two conductor line circuit, a transmitter, switch hook controlled contacts for connecting one terminal of the transmitter to one side of said line circuit when the receiver is removed, an induction coil and a permanent connection from the other terminal of the transmitter extending through one winding of said coil to the other side of said line circuit, a local circuit connecting the two terminals of the transmitter, said local circuit excluding said first coil winding and including a receiver, the second winding of said induction coil, and a condenser, and a second set of switch hook controlled contacts for closing said local circuit when the receiver is removed.

8. In a substation telephone set, a line circuit, an induction coil, a transmitter and one winding of said coil in a bridge of said line, a pair of contacts for closing the said bridge, a shunt circuit for said transmitter including a condenser, a second winding of said coil, and a receiver, a second pair of contacts in the shunt circuit, a subscriber's impulse sender for producing current impulses in the line circuit, a second bridge for connecting said sender directly across the line. said second bridge including the said first pair of contacts and a single open connection in the said sender, and a pair of contacts for closing said connection when the sender is operated.

9. In a substation telephone set, a line circuit, an induction coil, a transmitter and one winding of said coil in bridge of said line, a receiver, a local circuit for said receiver including a condenser, a second winding of said coil, and the said transmitter, a subscriber's impulse sender for producing interruptions of the line circuit, a shunt circuit for connecting said sender across the line over a path excluding the talking instrumentalities, means for closing said shunt circuit when the receiver is removed except for a single break at said sender, and contacts for closing said break when the sender is operated.

10. In a substation telephone set, a line circuit; an induction coil; a transmitter and one winding of said induction coil in a bridge of said line; contact springs for closing the said bridge; a shunt circuit for said transmitter including a condenser, a second winding of said induction coil, and a receiver; a second set of contact springs in the shunt circuit between the receiver and the said second coil winding; a second bridge including said first contact springs and normally open at another point; a subscriber's impulse sender for transmitting current impulses over the line circuit; and means for closing said second bridge when the said sender is operated.

11. In a substation telephone set, a line circuit; an induction coil; a transmitter and one winding of said induction coil in a normally open bridge of the line; a local circuit connecting opposite terminals of said transmitter and including a condenser, a second winding of said induction coil, and a receiver, said local circuit being normally open at two points; means for closing said bridge and local circuit; a subscriber's impulse sender for transmitting current impulses over the line circuit; a shunt circuit for connecting said sender across the line over a path excluding the talking instrumentalities, and contacts for closing said shunt circuit when the sender is operated.

12. In a substation telephone set, a line circuit, a ringer and a condenser in a bridge of said line, an induction coil, a transmitter and a winding of said induction coil in a second bridge of said line, a receiver and a second winding of said induction coil connected in series to form a conducting path extending from the junction of the ringer and condenser to the junction of the transmitter and said first winding, a normally open connection in the transmitter bridge, a second normally open connection in said conducting path, means for closing said connections, a subscriber's impulse sender including make and break contacts for transmitting current impulses over the line circuit, and a single pair of shunt springs in said sender adapted to short circuit a portion of the transmitter bridge when the said sender is operated.

13. In a substation telephone set, an induction coil, a transmitter and a circuit therefor including a winding of said induction coil, a receiver and a circuit therefor including a condenser, a second winding of said induction coil, and the said transmitter, normally open connections in said receiver circuit at two points, means for closing said connections, a subscriber's impulse sender at the substation, and a pair of contacts adapted to shunt the said transmitter when said sender is operated.

14. In a substation telephone set, an induction coil, a transmitter and a circuit therefor including one winding of said induction coil; a receiver and a circuit therefor including a condenser, a second winding of said induction coil, and the said transmitter; a normally open connection in the conductor common to said circuits, a second normally open connection between the receiver and said second winding; means for closing said connections; a subscriber's impulse sender at the substation, and a pair of contacts adapted to shunt the said transmitter and induction coil winding in series therewith when said sender is operated.

15. In a substation telephone set, a line circuit, an induction coil, a transmitter in bridge of said line, a condenser, a winding of said induction coil, and a receiver in a second bridge of said line, a conductor common to said bridges and including a second winding of said induction coil, a normally open connection in each bridge outside of the common conductor, means for closing said connections, a subscriber's impulse sender, and a single pair of shunt springs in said sender so connected that upon the operation of said sender both the transmitter and receiver are shunted if the receiver is off the hook, and the transmitter only if the receiver is on the hook.

16. In a substation telephone set, a line circuit, an induction coil, a transmitter in bridge of said line, a condenser, a winding of said induction coil, and a receiver in a second bridge of said line, a conductor common to said bridges and including a second winding of said induction coil, a normally open connection in each bridge outside of the common conductor, means for closing said connections, a subscriber's impulse sender, a single pair of shunt springs in said sender so connected that upon the operation of said sender both the transmitter and receiver are shunted if the receiver is off the hook and the transmitter only if the receiver is on the hook, a terminal strip providing for the line connections and all connections of said condenser and induction coil, a second terminal strip providing for all connections of the remaining apparatus, and a five conductor cord joining said terminal strips over which all necessary circuits are completed as set forth.

17. In a substation telephone set, a line circuit, an induction coil, a transmitter and one winding of said induction coil in a bridge of said line, said bridge including contact springs for closing the same, a shunt circuit for said transmitter including a condenser, a second winding of said induction coil, and a receiver, a set of contact springs in the shunt circuit between the receiver and the said second coil winding, a branch of said bridge connected in parallel with said transmitter and induction coil winding, a calling device comprising a pair of impulse springs in series with one line conductor, and a single pair of springs effective to close said branch upon the operation of said calling device.

18. In a telephone substation, an induction coil, a line circuit including a transmitter and one winding of said induction coil in bridge thereof, contacts for closing said bridge across the line, a branch of said bridge connected in parallel with said transmitter and induction coil winding, a shunt circuit for said transmitter including the second winding of said induction coil, a second set of contacts for closing said shunt circuit, a receiver and condenser included in said shunt circuit on opposite sides of the said second set of contacts, a calling device comprising a pair of impulse springs in series with one line conductor, and a single pair of springs effective to close said branch upon the operation of said calling device.

19. In a telephone substation, a two conductor line circuit, a transmitter, switch hook controlled contacts for connecting one terminal of the transmitter to one side of said line circuit when the receiver is removed, an induction coil, a permanent connection from the other terminal of the transmitter extending through one winding of said induction coil to the other side of said line circuit, a local circuit connecting the two terminals of the transmitter and including a receiver, the second winding of said induction coil, and a condenser, a second set of switch hook controlled contacts for closing said local circuit when the receiver is removed, a normally open shunt circuit connected in parallel with the circuit through the transmitter and induction coil winding, a calling device comprising a contact device for producing interruptions in the line circuit, and a second contact device controlled automatically during the operation of said calling device to close said shunt circuit.

Signed at Chicago, Cook county, Illinois this 13th day of October, 1919.

BERNARD D. WILLIS.